United States Patent [19]

Mogé

[11] Patent Number: 4,524,863

[45] Date of Patent: Jun. 25, 1985

[54] CONVEYOR APPARATUS

[75] Inventor: Robert A. Mogé, Milford, N.H.

[73] Assignee: Rockwell International Corporation, Pittsburgh, Pa.

[21] Appl. No.: 516,015

[22] Filed: Jul. 22, 1983

[51] Int. Cl.³ .............................................. B65G 17/16
[52] U.S. Cl. .................................... 198/797; 198/833
[58] Field of Search ............... 198/797, 799, 833, 838, 198/851

[56] References Cited

U.S. PATENT DOCUMENTS

| 1,663,746 | 3/1928 | Baker et al. | 198/797 |
| 1,771,022 | 7/1930 | Wachs et al. | 198/797 |
| 2,725,020 | 11/1955 | Mahoney | 198/797 |
| 3,107,778 | 9/1963 | Jordan | 198/838 |
| 4,037,715 | 7/1977 | Onishi et al. | 198/799 |

FOREIGN PATENT DOCUMENTS 0757404 8/1980 U.S.S.R. .............................. 198/833

Primary Examiner—Joseph E. Valenza
Assistant Examiner—Daniel R. Alexander

[57] ABSTRACT

A conveying apparatus for moving a plurality of spaced and interconnected support trays along horizontal pathways of different levels and thru pathways interconnecting the horizontal pathways. The apparatus includes tie rods interconnecting the sides of one support tray with another defining an endless chain of the latter and by crank members operatively connected to the tie rods and a pair of crank rods which extend into operative engagement with crank members of adjacent support trays, the latter as they travel through the conveyor pathways are maintained in uniform positions.

1 Claim, 7 Drawing Figures

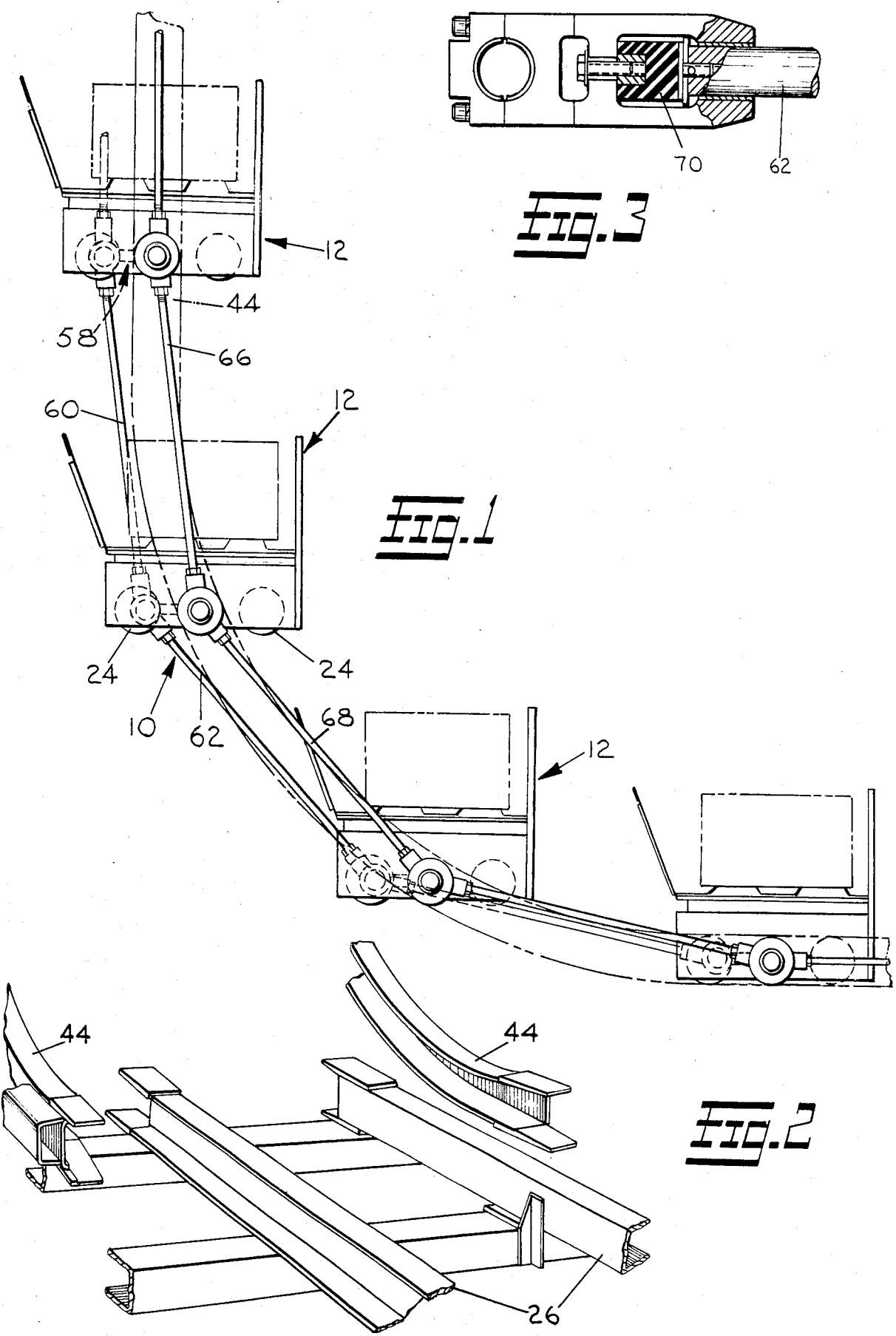

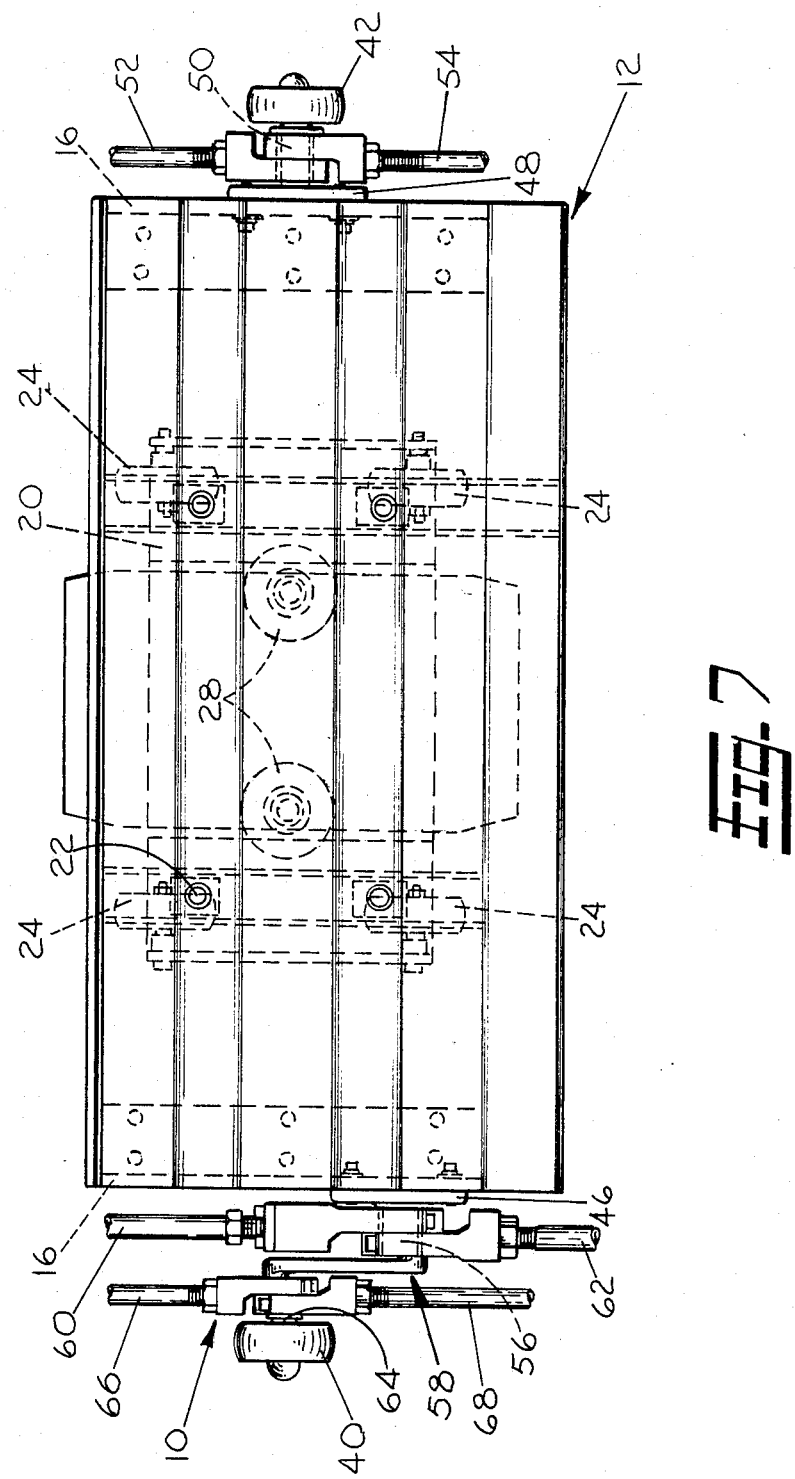

4,524,863

CONVEYOR APPARATUS

BACKGROUND OF THE INVENTION

1. Field of the Invention

The present invention pertains to a conveying apparatus which utilizes crank controlled linkage elements for interconnecting a plurality of spaced support trays that are driven and caused to travel in horizontal pathways disposed at different levels and in pathways that interconnect the horizontal pathways. The crank controlled linkage elements form an endless chain of support trays and the operatively associated crank members are effective in maintaining all of the support trays in uniform positions as they travel the various pathways of the apparatus.

2. Description of the Prior Art

A number of United States patents show and describe conveyor devices that utilize crank controlled linkage for maintaining the device's conveyor trays in level or uniform positions during their travel and, for reference to the teachings of such disclosures, attention is hereby drawn to U.S. Pat. Nos. 1,621,859 and 4,334,609.

SUMMARY OF THE INVENTION

The conveyor apparatus acording to the invention includes a plurality of spaced support trays interconnected by tie rods on each side thereof defining an endless chain of the trays. Additionally, each support tray has a crank member operatively associated therewith which includes a pair of crank rods pivotably connected thereto which extend in opposite directions to positions where they are operatively connected to the crank members of the adjacent support trays. The support trays have a plurality of first guide rollers mounted on the underside thereof which serve to guide them in a support track as they travel in a horizontal pathway. The support tray also includes a plurality of second guide rollers that are rotatably mounted adjacent the sides thereof and serve to guide them in a guide track as they leave one horizontal pathway and move in the direction of another that is disposed at a different level. As the support trays travel through the various pathways, the crank members and crank rods which are operatively connected, at least one set of tie rods and second guide rollers are effective in maintaining the support trays in uniform or level positions.

It is a general object of the invention to provide an improved conveyor apparatus for controlling the support trays thereof as they travel in horizontal pathways of different levels and in pathways leading from one horizontal pathway to another. A further and more specific object is to provide a conveyor apparatus which is effective in maintaining the support trays in a level or uniform position as they travel through the various pathways of the apparatus.

These and other objects of the present invention will become more fully apparent by reference to the appended claims and as the following detailed description proceeds in reference to the figures of drawings.

BRIEF DESCRIPTION OF THE DRAWINGS

FIG. 1 is a view in side elevation of the conveyor apparatus showing the linkage means interconnecting the plurality of support trays and for maintaining the latter in uniform positions;

FIG. 2 is a perspective view of the conveyor's support and guide tracks;

FIG. 3 is a view in side elevation and partially in section of a portion of a crank rod showing a cushion member mounted therein;

FIG. 7 is a top view of the supporting tray shown in FIG. 6.

DESCRIPTION OF THE PREFERRED EMBODIMENT

Referring now to FIG. 1, the conveyor apparatus according to the invention is identified generally by the numeral 10 and includes a plurality of spaced and interconnected support trays that are depicted generally by the numeral 12.

Figure 4:
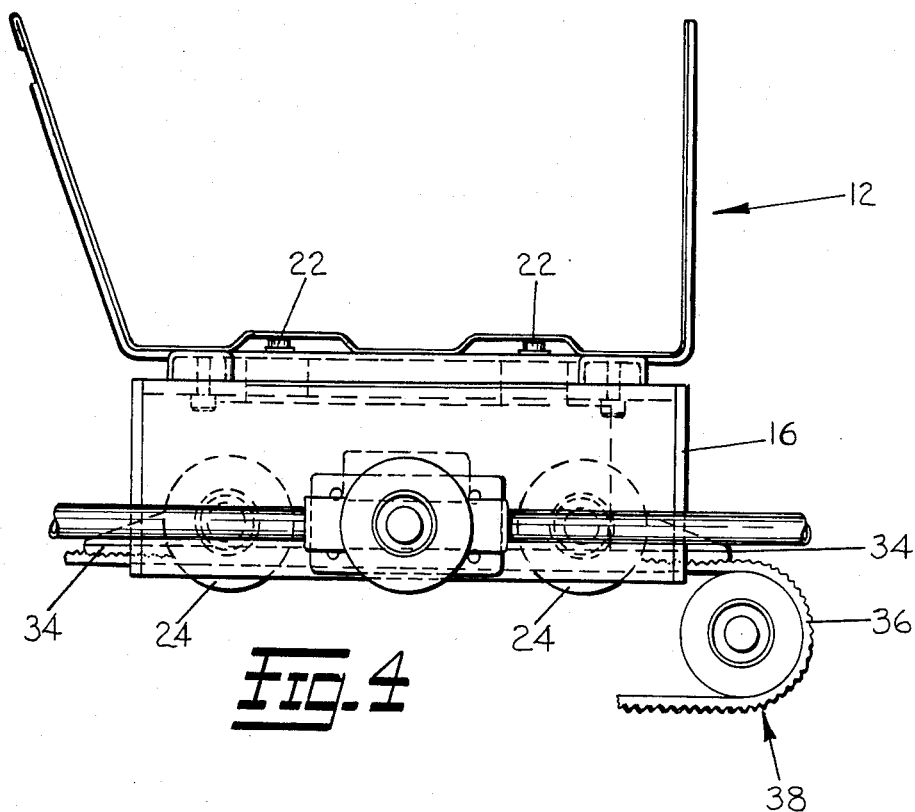
FIG. 4 is a view in side elevation of one of the support trays showing its association with a linear drive device.
Figure 5:
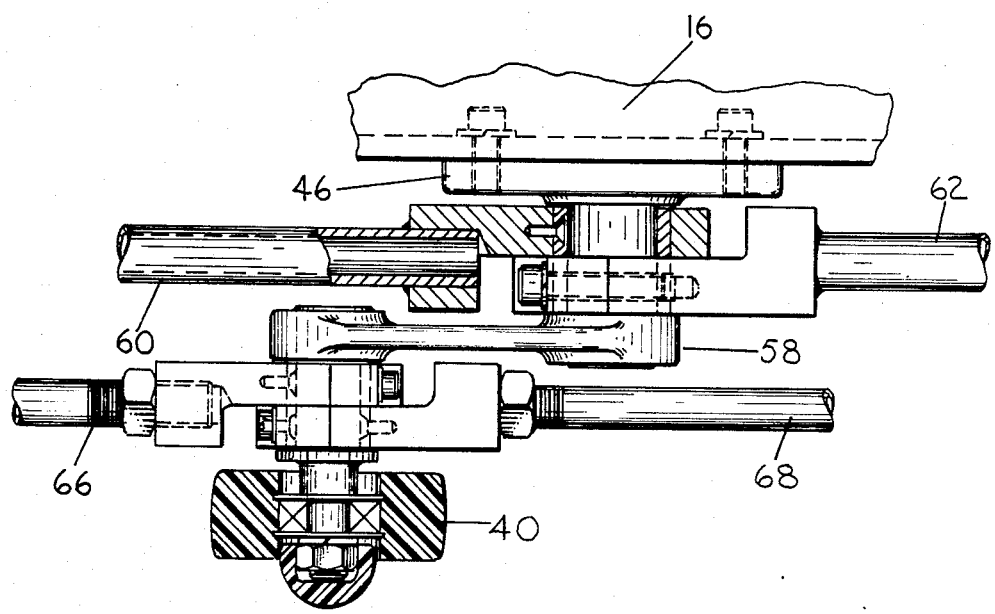
FIG. 5 is a top view partially in section showing further detail of the linkage means in FIG. 1.
Figure 6:
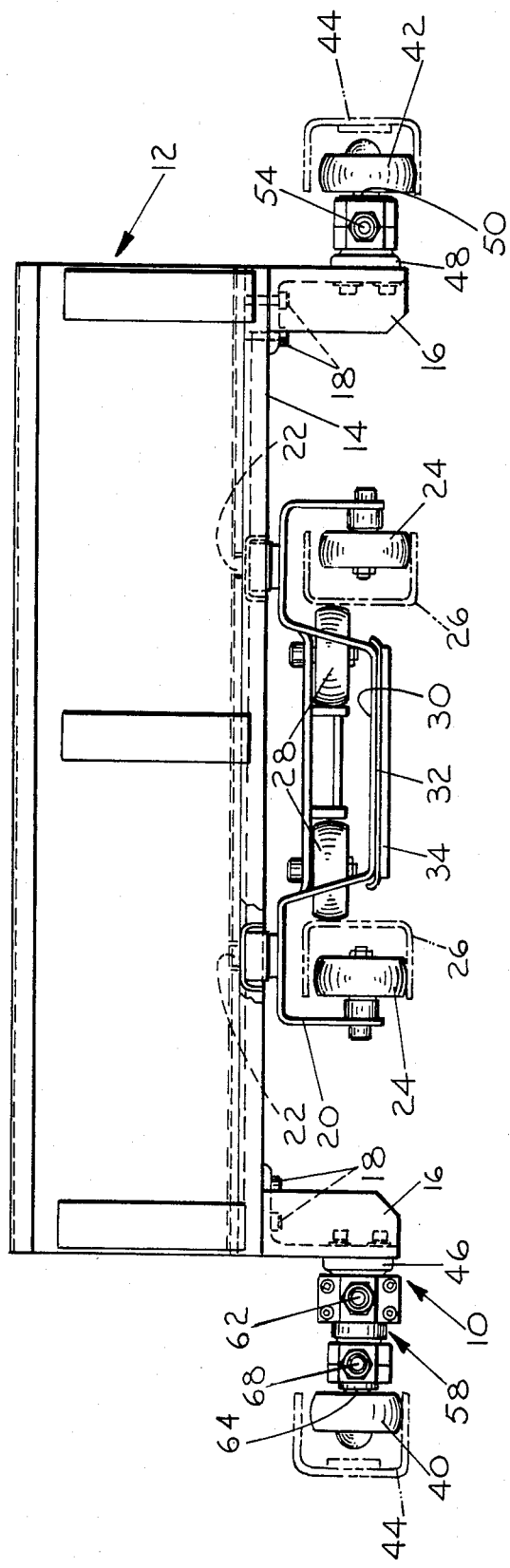
FIG. 6 is an end view of a supporting tray showing the guide rollers and track elements for guiding them from one horizontal pathway to another.

As shown in FIG. 6, the support trays 12 are provided with a lower support plate 14 which has a depending carrier bracket 16 fixed on each side thereof by means of cap screws 18. Intermediate the carrier brackets 16, the lower support plate 14 has a roller support bracket 20 fixed thereon by means of cap screws 22. This support bracket 20 rotatably supports a pair of spaced and aligned first guide rollers 24 which are adapted to travel in a pair of spaced parallel support tracks 26 (FIGS. 2 and 6) during travel of the support trays 12 in horizontal planes. The support bracket 20 also rotatably supports a pair of stabilizing rollers 28 (FIGS. 6 and 7) which are spaced from one another and are disposed in a manner whereby they engage the opposed side walls of the support tracks 26 so as to stabilize the support trays as they travel along the conveyor's horizontal pathways. Below the stabilizing rollers 28, the roller support bracket 20 is provided with a centrally disposed planar surface 30 to which a plate member 32 is fixed. This plate member 32 has a friction drive pad 34 fixed thereon which frictionally engages an endless drive belt 36 of a linear drive unit generally indicated in FIG. 4 by the numeral 38. Although not shown, it should be understood that any suitable source of drive can be utilized for moving or rotating the endless drive belt 36.

As shown in FIGS. 6 and 7, the support trays 12 are provided with second guide rollers rotatably supported adjacent each side thereof which are identified by numerals 40 and 42, respectively. These second guide rollers serve to guide the support trays 12 as they leave one set of horizontal support tracks 26 and move in the direction of another set disposed at a different level. To accomplish this, a pair of spaced and aligned guide tracks 44 (FIGS. 2 and 6) are adapted to receive the second guide rollers 40 and 42 just prior to the first guide rollers 24 leaving the support tracks 26. As shown in FIGS. 6 and 7, each of the depending carrier brackets 16 has a stud support bracket fixed thereon with that associated with roller 40 being identified by the numeral 46 and that with roller 42 by numeral 48. The stud support bracket 48 has one end of a stud member 50 fixed therein and its outer end rotatably supports the guide roller 42. Intermediate the guide roller 42 and the support bracket 12, the stud member 50 pivotably supports the lapped ends of opposed tie rods 52 and 54 which extend in opposite directions to interconnect with the stud members 50 associated with the adjacent support trays 12.

The stud support bracket 46 (FIGS. 6 and 7) pivotably supports the stud end 56 of a crank arm member identified generally by numeral 58. Intermediate the crank arm member 58 and the stud support bracket 46, the stud end 56 pivotably supports the lapped ends of opposed crank rods 60 and 62 which extend in opposite directions to interconnect with the stud ends 56 associated with the adjacent support trays 12. The opposite end of the crank arm member 58 defines a laterally extending stud 64 which rotatably supports roller 40 thereon and the crank arm 58, the stud 64 pivotably supports the lapped ends of opposed tie rods 66 and 68 which extend in opposite directions to interconnect with the ends of the crank arms operatively associated with the adjacent support trays 12.

In the configuration described, the plurality of first guide rollers 24 are captive within the horizontal support tracks 26 so that orientation of crank member 58 is controlled in a horizontal position. As support trays 12 travel from horizontal toward the vertical, the guide rollers 40 and 42 enter into the guide tracks 44, thereby causing the crank member 58 to maintain trays 12 in the same orientation as they had during the horizontal run. This effect is achieved basically by the 4 bar linkage consisting of crank member, crank and tie rods forming a parallelogram arrangement which maintains uniform positioning of the support trays 12.

As shown in FIG. 3, one end of each of the crank rods has a cushion member 70 assembled therein and serves to absorb linear deviations resulting from dimension tolerance buildup of the tie and crank rods in the linkage system that interconnects the support trays 12.

The tie rods on each side of the support trays form an endless chain of the latter and with the crank members and crank rods operatively connected to the tie rods on one side of the support trays, a means is provided whereby the latter are maintained in uniform positions throughout their travel about the conveyor's pathways.

Although the present invention has been described in connection with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

I claim:

1. A conveying apparatus having a plurality of interconnected and spaced support trays moved by a linear drive unit in horizontal pathways of different elevations and in directions interconnecting one horizontal pathway with another, said conveying apparatus comprising:
    (a) a plurality of first guide rollers rotatable mounted on the underside of each support tray;
    (b) a plurality of second guide rollers rotatable mounted adjacent the sides of each support tray;
    (c) a support track for receiving said first guide rollers for guiding the support trays in their horizontal pathways;
    (d) a guide track operatively associated with said support track for receiving said second guide rollers to effect guiding each support tray from one horizontal pathway to another;
    (e) a tie rod member pivotably interconnecting the second guide rollers of one support tray with the second guide rollers of the adjacent support trays defining an endless chain of the latter;
    (f) a crank member pivotably connected at a first end to at least one of said second guide rollers and said tie rods operatively associated therewith; and
    (g) a pair of crank rods pivotably connected to a second end of said crank member and extending in opposite directions for operative connection to the crank members associated with adjacent support trays, said crank rods have a cushion member mounted in one end for absorbing linear deviations resulting from dimension tolerance buildup of said tie and crank rods in said linkage means.

* * * * *